(12) United States Patent
Wallace et al.

(10) Patent No.: US 7,035,594 B2
(45) Date of Patent: Apr. 25, 2006

(54) METHOD AND APPARATUS FOR TESTING AND EVALUATING WIRELESS COMMUNICATION DEVICES

(75) Inventors: Raymond C. Wallace, San Diego, CA (US); Jeffrey Bartlett, San Diego, CA (US); John K. M. Lee, Ramona, CA (US)

(73) Assignee: Qualcomm Inc., San Diego, CA (US)

( * ) Notice: Subject to any disclaimer, the term of this patent is extended or adjusted under 35 U.S.C. 154(b) by 906 days.

(21) Appl. No.: 09/898,532

(22) Filed: Jul. 2, 2001

(65) Prior Publication Data

US 2003/0003883 A1 Jan. 2, 2003

(51) Int. Cl.
G01R 29/10 (2006.01)
H04B 17/00 (2006.01)

(52) U.S. Cl. ........... 455/67.12; 343/703; 455/67.14; 455/67.16; 455/115.2; 455/425

(58) Field of Classification Search .......... 343/703; 455/425, 67.11, 67.12, 67.13, 67.14, 63.16, 455/115.1, 115.2, 115.3, 423, 424
See application file for complete search history.

(56) References Cited

U.S. PATENT DOCUMENTS

| | | | |
|---|---|---|---|
| 5,805,667 A | 9/1998 | Alvarez et al. ......... 379/1.01 |
| 6,021,315 A | 2/2000 | Telewski ............... 455/67.11 |
| 6,208,841 B1 | 3/2001 | Wallace et al. ......... 455/67.12 |
| 6,329,953 B1 * | 12/2001 | McKivergan ............ 343/703 |
| 2003/0008620 A1 * | 1/2003 | Rowell et al. .......... 455/67.1 |

OTHER PUBLICATIONS

Bruce Eggers, "An Analysis of the Balun" Apr., 1980 pps. 19-21.

* cited by examiner

*Primary Examiner*—Harry S. Hong
(74) *Attorney, Agent, or Firm*—Phil R Wadsworth; Charles D. Brown; George C. Pappas

(57) ABSTRACT

A testing chamber is configured to evaluate the accuracy of a wireless communication device under test in a production environment. The configuration of the testing chamber may resemble an enclosed structure having a wall that includes multiple layers. An array of antennas, which serves as a layer of the wall, is strategically positioned within the testing chamber to receive and transmit signals emitted to/from the wireless communication device. Located within the testing chamber is either a stationary or moveable holder to support the wireless communication device. Furthermore, during testing, the forward link and the reverse communication links are monitored by selectively or alternatively adjusting and shifting the phase/amplitude of the antenna of the wireless communication device to mitigate the effects of multi-path fading.

20 Claims, 6 Drawing Sheets

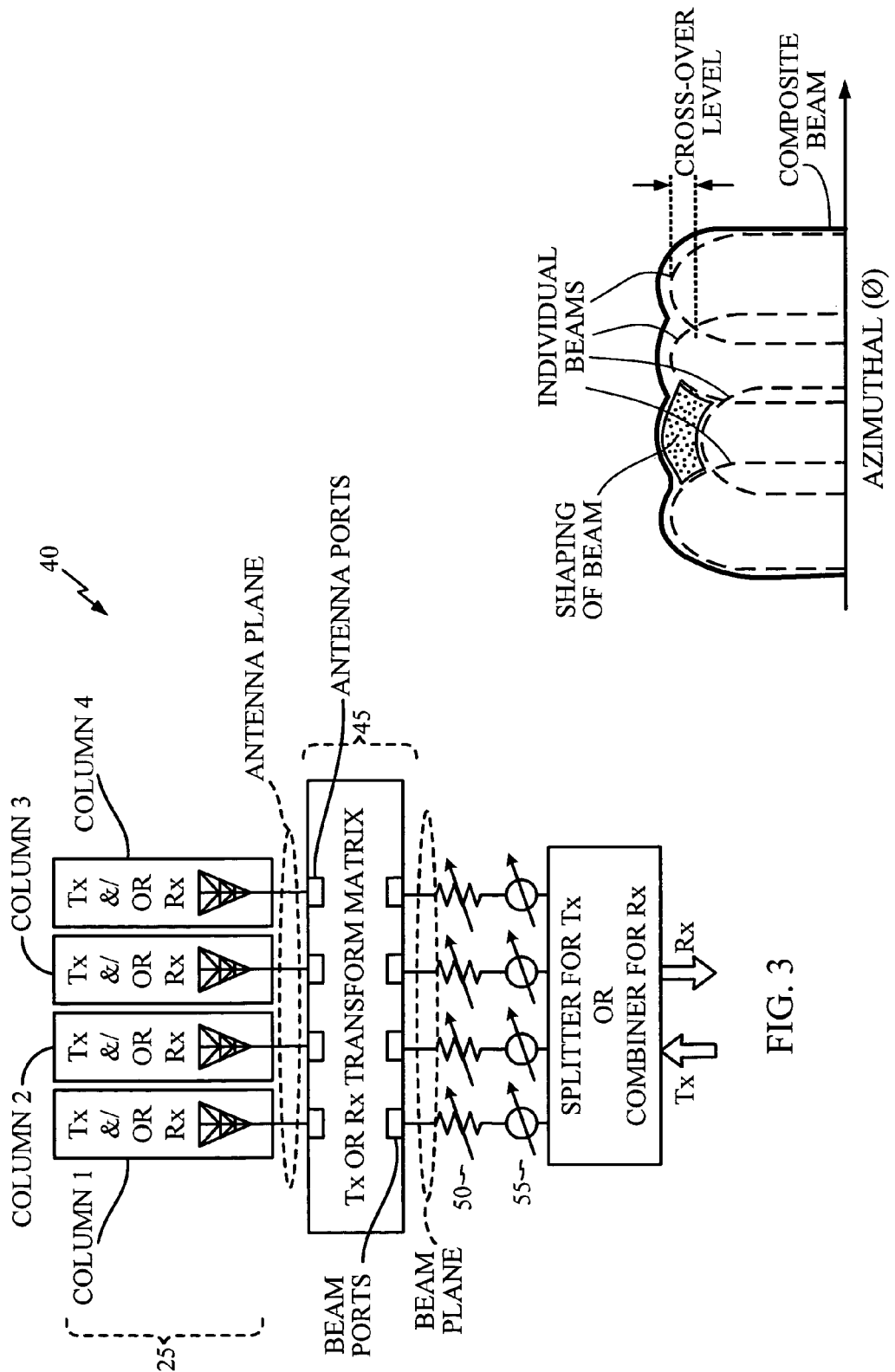

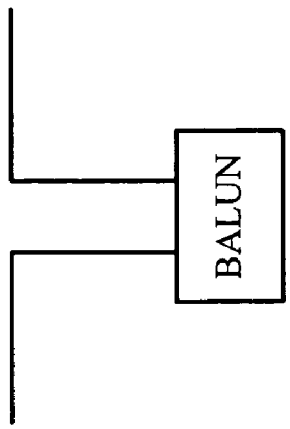
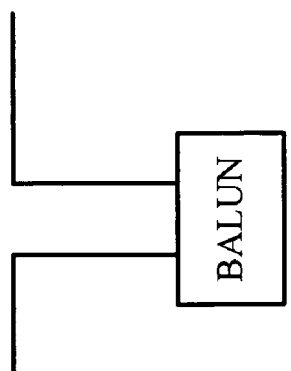
FIG. 6
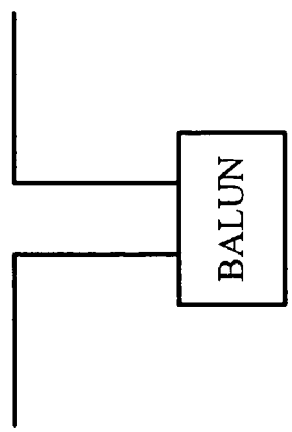

SIDE VIEW

METHOD AND APPARATUS FOR TESTING AND EVALUATING WIRELESS COMMUNICATION DEVICES

BACKGROUND OF THE INVENTION

1. Field of the Invention

The invention generally relates to the field of wireless communications. More particularly, the present invention relates to a system and method that test and evaluate a wireless communication device in a production environment.

2. Background Information

The efficiency and effectiveness of a wireless communication device depend on the performance of its antenna. In designing wireless communication devices, one important factor considered is the antenna's radiation pattern. During operation, the wireless communication device must be able to effectively communicate with other such devices or a base station, hub or satellite, which may be located in various directions away from the wireless communication device. As a result, it is important that the antennas for such wireless communication devices emit the appropriate radiation pattern.

The radiation patterns of the antenna are also important in relation to government radiation standards promulgated for wireless communication device users. According to government regulations, the radiation patterns must be controlled or adjusted so that users absorb only a minimum amount of radiation.

One type of current testing device that has been used to measure an antenna's performance is an anechoic chamber. Such anechoic chambers may comprise large testing devices, as described and illustrated in the publication entitled "An Analysis of the Balun", written by Bruce A. Eggers and published in April 1980. The large anechoic chamber, commonly referred to as a Free-field room or Free-space room, is a testing laboratory designed having a square or rectangular outer structure surrounding an interior surface, which is completely lined with an absorptive material. The absorptive material serves to mitigate any interference signals or reflections generated during testing within the anechoic chamber.

Since space is often at a premium in a factory, some have opted to reduce the size of the testing chamber, which reduction may result in a reduction in the accuracy of the testing results. U.S. Pat. No. 5,805,667, granted to Alvarez et al. on Sep. 8, 1998, discloses such a testing device.

SUMMARY OF THE INVENTION

In accordance with one embodiment, a testing chamber is provided to house a wireless communication device under testing. An array of antennas is attached to the inner surface of the testing chamber. The arrangement of the array of antennas is configured so that the arrangement receives signals emitted from the wireless communication device and transmits signals to the wireless communication device. During testing, the wireless communication device is placed and retained within a holder located within the testing chamber. A computer connects to the testing chamber for measuring the characteristics of the signals transmitted to and from the wireless communication device. The computer also shapes the beam of the transmit signals emitted from the arrangement of the array of antennas.

A specific embodiment may be provided with features allowing it to offer several different modes of testing the device. For instance, a quick and simple go and no-go test may be permitted. Alternatively, a beam sweeping mode may be activated. During the beam sweeping mode, the device automatically sweeps the circumference of the testing chamber and sequentially activates each antenna individually so as to create a beam sweeping effect within the testing chamber. Additionally, the wireless communication device may be tested under an integrated mode, which simultaneously activates all of the antennas of the antenna array arrangement. During the integrated mode, all of the antennas of the antenna array radiate simultaneously towards the wireless communication device and excite the wireless communication device from all directions and angles.

The configuration of the testing chamber may resemble various shapes. For example, in one embodiment, the testing chamber resembles a sphere.

The holder, which retains the wireless communication device during testing, may be either a stationary device or a movable positioner that moves horizontally, vertically or both. According to one embodiment, as the movable positioner rotates and moves the wireless communication device, the computer connected to the testing chamber determines the accuracy and performance of the wireless communication device by averaging the magnitude of the RF waves transmitted along the forward and reverse communication links.

If multi-path propagations develop during testing, the invention may employ several novel features to compensate for the deleterious effects of multi-path propagations. For example, the computer may automatically shape and contour the beam emitted from the array of antennas by adjusting the phase and amplitude of one or more of the antennas. Furthermore, using the movable positioner, the position of the wireless communication device may also be varied to relocate the device away from an interior wall of the testing chamber in order to offset the effects of multi-path propagation.

Another aspect of the invention enables the array of antennas, which line the wall of the testing chamber, to detect the gain in a particular direction or perform "antenna pattern" measurements of the wireless communication device under testing. The antennas of the array of antennas may be activated selectively, sequentially, or simultaneously.

BRIEF DESCRIPTION OF THE DRAWINGS

FIG. 3 depicts an antenna arrangement;

FIG. 4 is a exemplary diagram of a composite beam emitted from the antennas of FIG. 3;

FIGS. 5 and 6 are examples of configurations of dipole antennas array that may be employed;

DETAILED DESCRIPTION OF THE PREFERRED EMBODIMENTS

A system and method, and parts thereof, are provided to facilitate the testing of wireless communication devices. In the embodiments illustrated herein, the device being tested is a wireless telephone. However, the testing apparatus 100 may be used to perform testing and analysis of virtually all wireless communication devices, and it is not limited only to wireless telephones.

Figure 1:
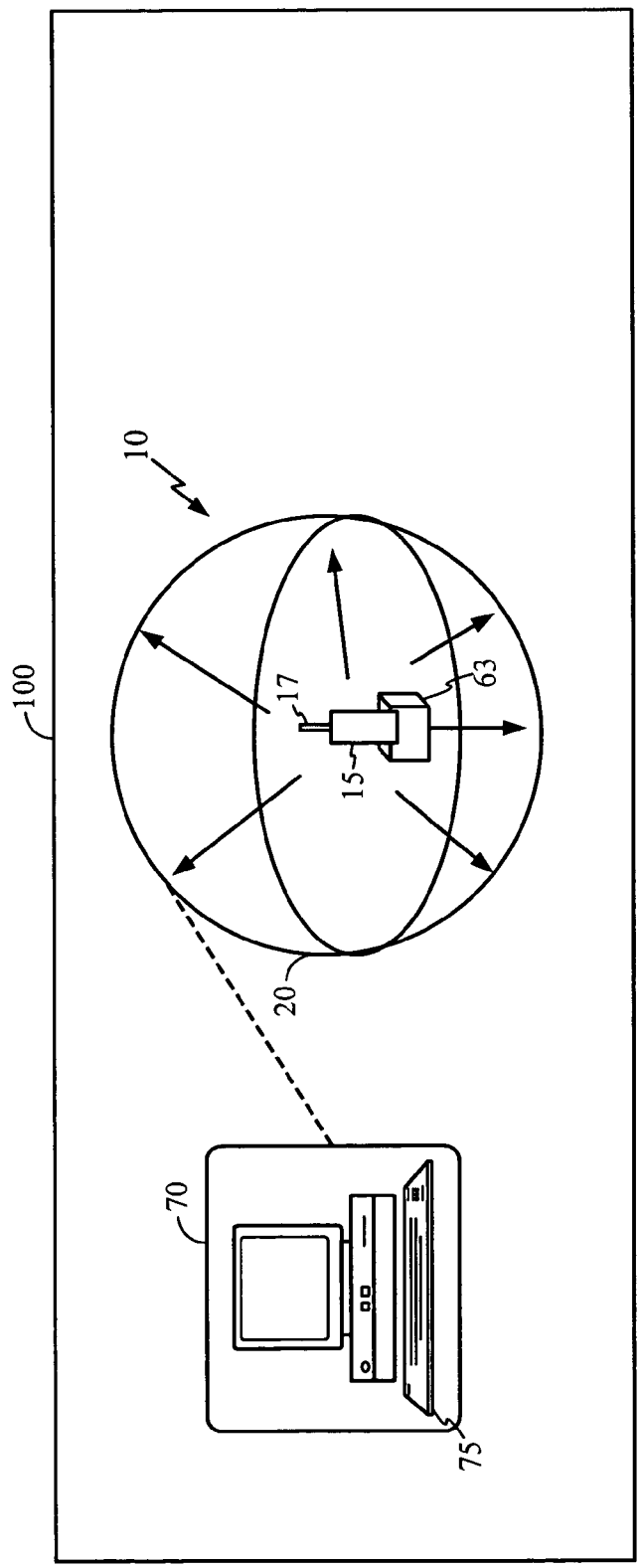
FIG. 1 illustrates a testing apparatus in accordance with one embodiment.

FIG. 1 shows one embodiment of the testing apparatus 100 for testing the transmit/receive performance of a wireless communication device 15. The testing apparatus 100 comprises a wireless communication device 15, a testing chamber 10, and a data processing device, such as shown by computer 70. To assist in the understanding of the present invention, a brief description of a typical wireless communication device 15 will be provided. FIG. 1 illustrates a conventional wireless communication device 15. An antenna 17 is coupled to a transmitter (not shown) and a receiver (not shown). The transmitter (not shown) and receiver (not shown) may share some circuit components and be considered a transceiver. The transmitter and receiver operate at frequencies that are assigned for various types of wireless communication devices.

A typical wireless communication device 15, such as a handheld cellular telephone, also includes a central processing unit (CPU) (not shown), which may be an embedded controller or conventional microprocessor. In addition, the wireless communication device 15 includes a memory, which may include both random access memory (RAM) and read-only memory (ROM). A keypad may be included to permit the user to operate and control the wireless communication device 15. A microphone and a speaker may provide audio input and output, respectively. A display may provide the user with information regarding the operation of the wireless communication device 15. The operation of such conventional wireless communication devices are well known in the art and thus will only be described in the context of the present embodiments.

Figure 8:
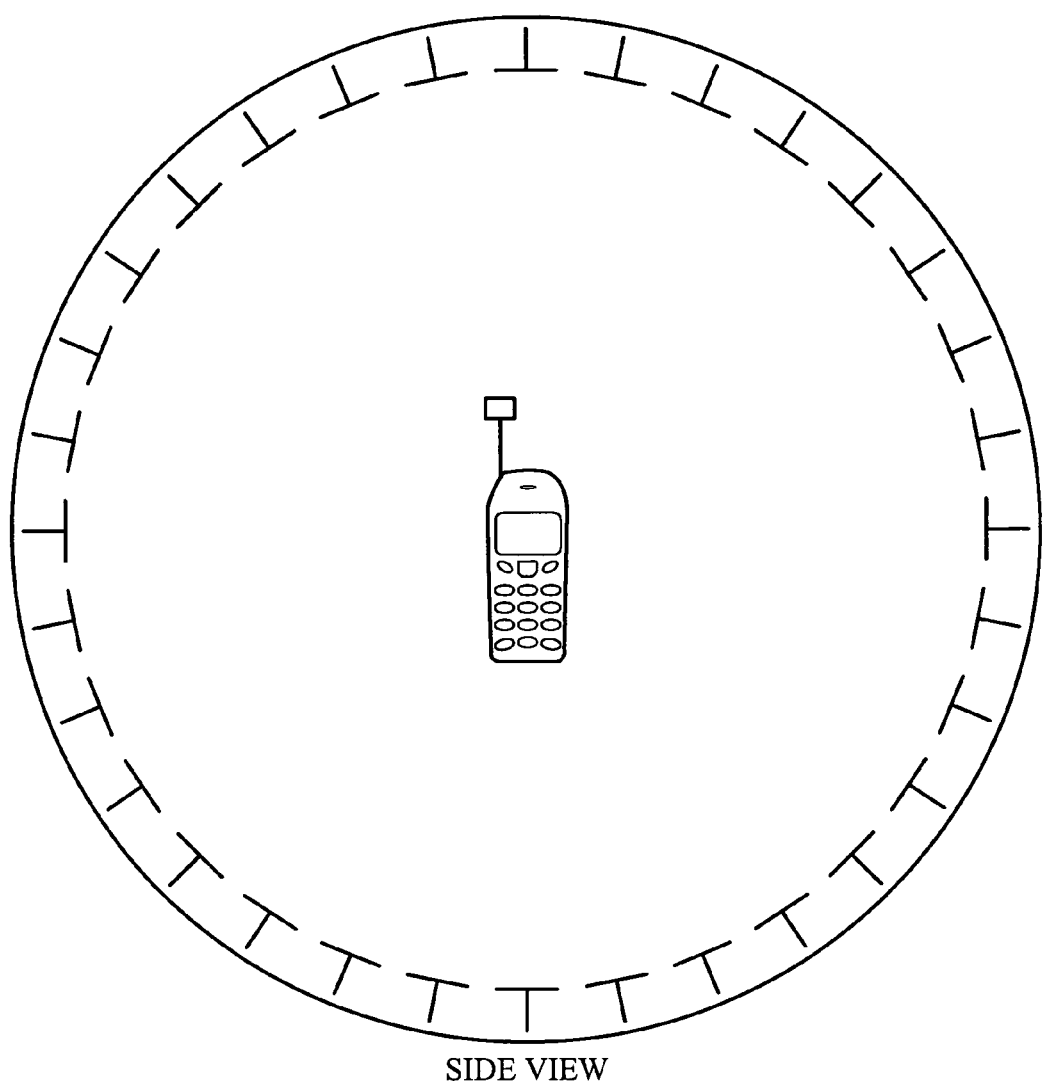
FIG. 8 is an alternative embodiment of the antenna arrangement positioned within the testing chamber.

As illustrated in the embodiment of FIG. 1, the testing chamber 10 is a testing device enclosed by wall 20 and containing a holder 63 attached thereto. The configuration of the testing chamber 10 may resemble various configurations, while the testing chamber 10 still maintains its capabilities to implement the invention. However, the embodiments, in FIGS. 1 and 8, illustrate the shape of the testing chamber 10 as being substantially spherical.

The spherical shape of this embodiment serves to mitigate the disadvantages associated with the rectangular configuration of most conventional wireless communication testing devices. Typically, using a rectangular or box structure means that the device under testing may be located closer to some inner walls than others. The proximity of the device to the inner wall determines the amount of multipath propagation generated within the testing chamber. If the device is located closer to the wall, more multipath fading will be generated. During testing, the signals transmitted to and from the device under testing will impinge the interior of the chamber and create multiple versions of the original signal, i.e., reflections, that arrive at the receiving element of the antenna of the device under test. Because the same signal arrives at the device under test over several paths, each with a different electrical length, the phases of each path will be different, resulting in multipath fading, signal distortion or both.

The absorptive material, which typically lines the interior of most rectangular or box-shaped chambers, serves to lessen the effects of interference signals generated by the multiple versions of the original signal. Nevertheless, the absorptive material works best when the waves of the signal arrive at the device under test from a 90° angle of incidence. The rectangular or box-shaped testing chamber typically provides an incident angle of a wave front other than 90°, which reduces the effectiveness of the absorptive material. Inherently, a spherical-shaped testing chamber 10 of this embodiment provides the maximum amount of attenuation of reflected waves, and does so using standard absorbing material common in today's industry. The spherical-shaped chamber 10 thus provides a substantially normal (perpendicular) orientation between its wall and any radiating object under test disposed therein.

Figure 2:
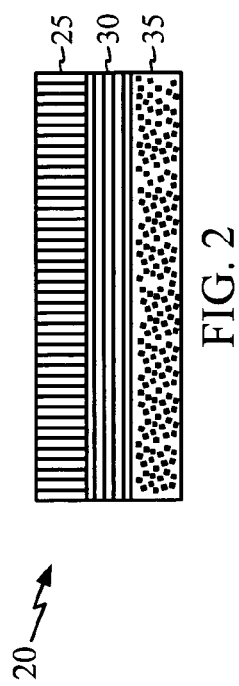
FIG. 2 illustrates an exemplary embodiment of the composition of the wall of the testing chamber.

FIG. 2 illustrates a more detailed depiction of the composition of the wall 20 of the testing chamber 10 according to this embodiment. The wall 20 includes an array of antennas 25, an absorbing material 30, and an outside layer 35. At least one antenna 25, preferably an array of antennas 25 of an antenna system 40, lines the inner wall of the testing chamber as an inner layer. The antennas of an antenna array arrangement 25 are strategically positioned within the inner wall of the testing chambers to receive signals emitted from the wireless communication device 15. The antenna array arrangement 25 also transmits signals to the wireless communication device 15. The antenna array arrangement 25 may completely cover the inner wall or may cover only segments of the inner wall.

Figure 5:
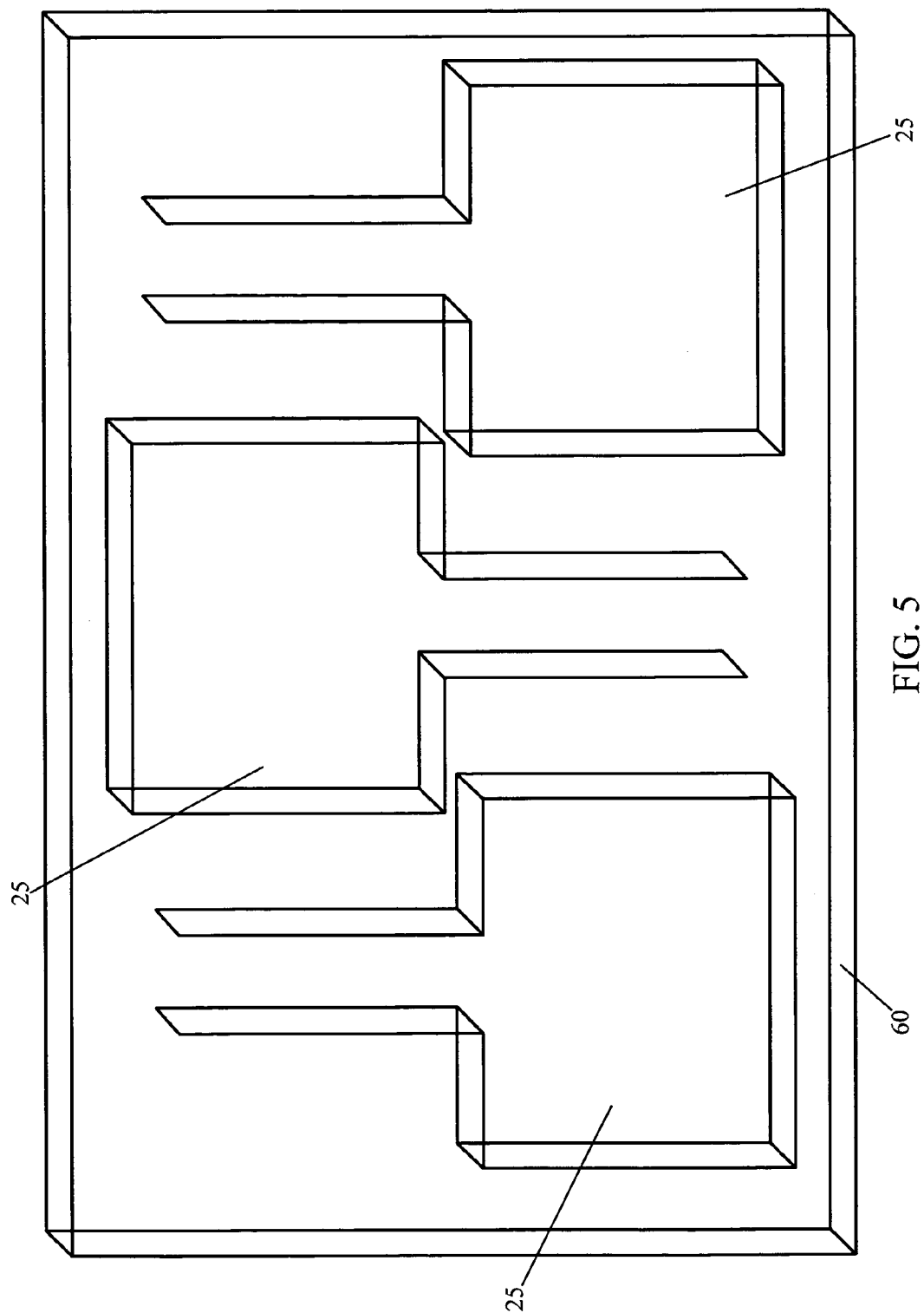
Figure 7:
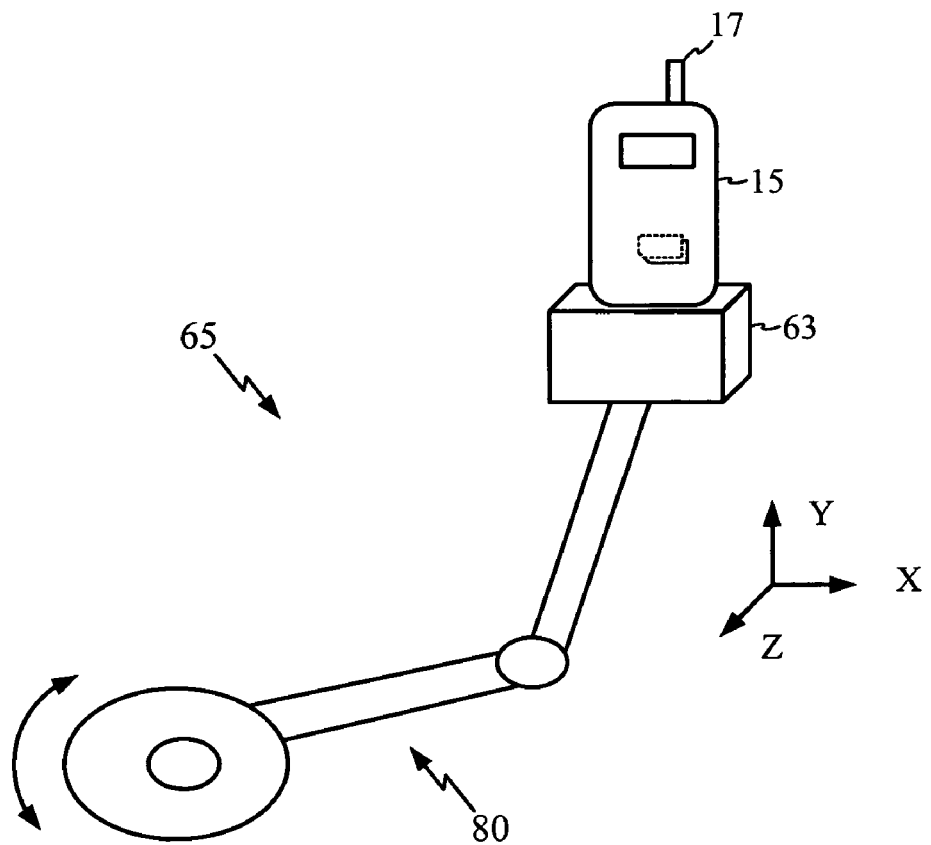
FIG. 7 illustrates a positioner according to an embodiment.

FIGS. 5 and 6 illustrate exemplary embodiments of the antenna array arrangement 25 that may be employed in the invention to provide a source of radio frequency energy within the testing chamber 10. FIG. 5 shows an example of magnetic dipole antennas 25, and FIG. 7 shows an example of a dipole antennas that include a Balun, which feeds a balanced antenna. A Balun is a device that joins a balanced line (one that has two conductors, with equal currents flowing in opposite direction, such as a twisted pair cable) to an unbalanced line (one that has just one conductor and a ground, such as a coaxial cable). A Balun is a type of transformer used to convert an unbalanced signal to a balanced signal or vice versa. Baluns isolate a transmission line and provide balanced output. A typical use for a Balun is in a television antenna, i.e.—a rabbit ear antenna. Similarly, dipole antennas with Baluns, shown in FIG. 8, function as TV rabbit ears that may be adjusted to a particular angle. Likewise, in FIG. 8, the angle of the dipole antennas has been adjusted to be approximately 180 degrees.

The dipole antennas of either FIG. 5 or FIG. 7 may constitute a receive only antenna, a transmit only antenna or a receive and transmit antenna, i.e., a transceiver. The exemplary dipole antennas may be oriented horizontally, vertically, or at a slant. The polarization of the RF signal radiated by a dipole transmitting antenna corresponds to the orientation of the element. Thus, the orientation of the antennas 25 may be controlled and adjusted by computer 70 as needed.

In the embodiments shown in FIGS. 1 and 2, the spherical testing chamber 10 includes an array of antennas 25 distributed around the entire inner surface of the testing chamber 10.

Alternatively, as shown in the embodiment of FIG. 8, the shape of the antenna array arrangement 25 may be configured to cover only a portion of the testing chamber 10. For example, the embodiment of FIG. 8 illustrates that the antennas 25 of the antenna system 40 may be designed to form a ring along the inner wall 20 of the testing chamber 10. The ring configuration of FIG. 8 or other alternative designs may be constructed by strategically positioning and/or attaching the antennas 25 of the antenna system 40 inside the testing chamber 10 to form such a configuration. Alternatively, such configurations may be formed in the embodiment where the antennas completely cover the inner surface wall 20 by selectively activating particular antennas 25 to form such a configuration. The testing apparatus 100 may be designed so that the shapes of different configurations may be automatically programmable or preprogrammed into the computer 70.

The quantity and the alignment of the antennas 25 of the antenna system 40, lined within the inner layer of the wall 20, depend upon the testing conditions established by each user. The geometry of the testing chamber 10 and the degree of precision desired may also be a factor in determining the selection of the configuration of the antenna 25 arrangement. For instance, if a user desires an azimuthal granularity that is capable of testing every 10 angular degrees within a spherical-shaped testing chamber 10, the size of the spherical-shaped testing chamber 10 will determine the number of antennas needed to cover the 360 degrees circumference of the sphere. Obviously within this hypothetical, a large testing chamber would require more antennas than a smaller testing chamber. Other factors that may influence the configuration of the antenna array arrangement 25 are the operating frequencies of the wireless communication device 15 and the antenna system 40. In other words, the configuration of the antenna array arrangement depends upon the user's test requirements and conditions. One skilled in the art would recognize that various embodiments of the invention may be configured without departing from the spirit and scope of the invention.

A more detailed description of the operation of the antenna array arrangement 25 will be provided below in reference to FIG. 3 and to the description of the operation of the embodiments.

The embodiment of FIG. 2 further illustrates that an absorptive material 30 may serve as a middle layer of the wall 20 to absorb and reduce the amount of internal signal interferences or reflections generated within the testing chamber 10 during testing. The absorptive material 30 absorbs the RF waves generated in the testing chamber 10 by converting the energy of the waves into heat that is absorbed into the absorptive material 30, instead of being reflected outwardly into the testing chamber 10. The absorptive material 30 may, for example, include a layer of styrofoam covered with absorbing paint.

As shown in FIG. 2, according to this embodiment, the outside layer of the testing chamber 10 may include an outer wall 35. The outer wall 35 may be any material that excludes external signal interferences by physically isolating the testing chamber 10 from the surrounding environment. However, in the preferred embodiment, the outer wall 35 is a metal skin.

Referring to the embodiment of FIG. 1, the holder 63 located in the testing chamber 10 supports and retains the wireless communication device 15 during testing. The holder 63 may be either stationary or mobile. A stationary holder 63 may attach to the testing chamber 10 by a mechanical attaching mechanism (not shown). In an alternative embodiment, the holder 63 containing the wireless communication device 15 may sit within a mobile positioner 65 (FIG. 7), which varies the position of the wireless communication device 15 horizontally, vertically or both during testing.

FIG. 7 illustrates an exemplary embodiment of a mobile positioner 65, but other structures known to one of ordinary skill in the art may also be employed. The positioner 65 may include a linkage mechanism 80, which connects to a rotating disk 85 connected to the testing chamber 10 and operated by the computer 70. The linkage mechanism 80 may be moved horizontally, vertically or simultaneously in both directions in order to vary the horizontal, as well as the azimuthal plane of the wireless communication device 15. Namely, the movement of the linkage mechanism 80 may resemble, for example, the extension and retraction of the arms of a merry-go-round. The positioner 65 may also be designed to hold multiple wireless communication devices 15.

Referring once again to the embodiment of FIG. 1, the computer 70 connects to the testing chamber 10 to control the testing operations of the testing apparatus 100. The computer 70 includes typical components, such as a central processing unit (CPU) and a memory. A user interface 75 is also coupled to the computer 70. The user interface 75 typically includes a display and a user input device.

The computer 70 may also communicate directly with the wireless communication device 15 using a cable coupled between the computer 70 and the keypad connection for initiating the operations of the wireless communication device 15. The computer 70 may also send commands to the wireless communication device 15 to control its transmitter, receiver, and control circuitry during testing.

With the various embodiments of the system components having been briefly described, the different embodiments of the design and operation of the testing apparatus 100 will now be described in greater detail. In order to determine the accuracy and efficiency of the radiated performance of the transmit elements of the antenna 17 of the wireless communication device 15, one embodiment of the invention provides a simulation model that predicts characteristics of the signals, such as the average received signal strength emitted at a given distance from the transmitter of the antenna 17 of the wireless communication device 15. Alternatively or conjunctively, another embodiment determines the variability of the signal strength of the beam emitted from the antenna in close spatial proximity to a particular location. To assess such characteristics of the signals emitted to and from the antenna 17 of the wireless communication device 15, the testing apparatus 100 detects and measures the magnitude of the RF waves propagated by the transmitter of the antenna 17 of the wireless communication device 15 and the magnitude of the RF waves reflected off the interior surface of the testing chamber 10 during operation. After measuring the RF waves, the testing apparatus 100 may average the sum of the RF waves to determine the average of the magnitude of the RF waves received signal strength emitted at a given distance from the transmitter of the antenna 17 of the wireless communication device 15.

FIG. 1 illustrates the testing chamber 10 during testing according to one embodiment of the present invention. The testing chamber 10 houses the wireless communication device 15. During operation, the signals transmitted from the wireless communication device 15 are detected by the antenna of the antenna array arrangement 25, which arrangement is mounted on and serves as the inner layer 25 of the testing chamber 10. As illustrated in FIG. 3, the antenna array arrangement 25 may constitute an antenna system 40. FIG. 3 depicts a representative embodiment of the antenna system 40 comprising an exemplary embodiment of the antenna array arrangement 25, which functions as the inner layer 25 and couples to a transform matrix 45. As illustrated in FIG. 3, the configuration of the antenna arrangement 25 and the transform matrix 45 permit either transmit or receive operations. The transform matrix 45 comprises a plurality of beam ports on a beam-plane side of the matrix 45 and a plurality of antenna ports of the antenna-plane side of the matrix. Each column array of the multi-columnar antenna array arrangement 25 couples through the matrix 45 to the beam ports. During transmission of the antenna system 40, this configuration enables the transform matrix 45 to receive signals, which include relative amplitude and phase information, from the beam-plane ports. Based on this information, the matrix 45 transforms the beam-plane signals into signals appropriate for the radiating antenna elements and delivers such signals to all the antenna ports. Then, the antenna elements within the multi-column antenna array arrangement 25 radiate a narrow beam patterns in different directions in accordance with the transformed signals.

Conversely, during the antenna system 40 reception, the transform matrix 45 receives signals from the antenna-plane ports and transforms them into signals appropriate for processing. As such, the illustrated antenna system 40 forms a plurality of narrow beam patterns that span outwardly into different angular directions for a given axis. In FIG. 3, each beam port associates with respective beam patterns.

FIG. 4 further illustrates that each of the beam ports on the beam-plane side of the transform matrix 45 of FIG. 3 couples to an amplitude or gain adjusting element 50 and a phase adjusting element 55. Elements 50, 55 allow for amplitude/gain and phase adjustments to be made in order to control the shape of the antenna beam patterns, as depicted in FIG. 4.

FIG. 4 illustrates a typical composite beam pattern radiated by the antenna system 40 shown in FIG. 3. The transform matrix 45 supplies signals to the four individual antenna ports which enables the antenna elements to form four individual beams. The aggregate effect of these individual beams forms the envelope composite beam, as indicated in FIG. 4. As stated above, the amplitude/gain adjusting elements 50 and phase adjusting elements 55 make it possible to control the shape of the antenna beam patterns. The amplitude level at which the individual beams (i.e., sub-beams) intersect is called the cross-over level. The position of the cross-over level depends, at least in part, on the optimal separation distance of the antenna elements contained in the antenna array arrangement 25.

The signal received by the antennas 25 may be carried outside of the testing chamber to computer 70 and other recording equipment via a coaxial feed line or other known forms of remote communications. In addition, the computer 70 controls the selection of the transmitter's operating parameters, such as the carrier frequency and the output power of the transmitter of the antenna array arrangement 25. Similarly, the computer 70 receives data in the form of a receiver output signal generated by the receive element in response to RF signals received from the wireless communication device 15 during testing. Furthermore, the computer 70 controls the selection of the receiver operating parameters, such as the carrier frequency and the gain of the receive elements of the antenna array arrangement 25.

To test a wireless communication device 15, initially, such a device 15 may be placed on the holder 63 inside the testing chamber 10 and activated either manually by a user or automatically by the computer 70. Next, the user may establish the operating parameters, i.e.—the carrier frequency and the transmitted power output, of the transmit elements of the antenna array arrangement 25 of the antenna system 40 by prompting the computer 70 to activate a single antenna transmit element 25 or a plurality of antenna transmit elements 25 of the antenna system 40. Using the computer 70, the transmit elements of the antenna array arrangement 25 may be programmed to selectively or simultaneously vary several operating parameters of the antennas of the antenna array arrangement 25. For example, the phase and the amplitude of each antenna may be varied to transmit at a different frequency, a different angle and/or a different time.

To test the forward communication link, from the antenna system 40 to the wireless communication device 15, the computer 70 instructs the antenna system 40 to send RF signals along the transmission link (Tx) through a splitter, which divides the RF signal among the activated transmit elements, as illustrated in FIG. 3. The divided RF signals travel through the phase adjusting element 55 and the amplitude or gain adjusting elements 50 and enters the transform matrix 45. The transform matrix 45 receives the signal, which includes the relative amplitude and phase information, from the beam-plane ports. Based on this information, the transform matrix 45 transforms the beam-plane signals into signals appropriate for radiating antenna elements and delivers such signals to all of the activated antenna ports. The transform matrix supplies the RF signals to the antenna ports of the activated transmit elements and enables the antenna elements to form individual beams, as shown in FIG. 4. The transmit elements of the antenna array arrangement 25 emits the RF signals, which are detected by the receiver of the wireless communication device 15. The control circuitry of the wireless communication device 14 converts the received signal into signals appropriate for processing by the computer 70, which also connects to the wireless communication device 15. The computer 70 determines the magnitude and other characteristics of the signal received at the wireless communication device 15 to assess the accuracy of the wireless communication device along the reverse communication link.

When testing the radiated performance of wireless communication device along the reverse communication link, from the wireless communication device 15 to the antenna system 40, the computer 70 instructs the wireless communication device 15 to send a signal along its transmission link to the antenna system 40. The computer device 70 may establish the initial operating parameters, i.e.—the frequency and the transmit power for the transmitter, of the wireless communication device 15. Similarly, as discussed above, the phase and amplitude of the wireless communication device may be varied. The receive elements of the antenna system 40 intercepts the RF signals sent from the wireless communication device 15. The transform matrix 45 receives the signals from the antenna-ports and transforms them into signals appropriate for processing by the computer 70. The combiner combines the received signals and transmits them to the computer 70. Then, the computer 70 determines the magnitude and other characteristics of the signals received at the antenna system 40 to assess the accuracy and efficiency of the wireless communication device 15 along the reverse communication link. The computer 70 averages the total energy of the received signals detected by the antenna system 40 to quantify how much energy the wireless communication device 15 radiates in all directions. The computer 70 may also be employed to measure other characteristics of the wireless communication device 15.

Different operating embodiments of the invention offer different techniques to analyze the transmission characteristics of the signal emitted from the antenna 17 of the wireless communication device 15 and to test other parameters of the wireless communication device 15. For instance, according to one embodiment, if the user wants to simply determine if the antenna 17 is properly connected to other components of the wireless communication device 15. The wireless communication device 15 may be inserted into the testing chamber 10 to perform a simple go and no-go test, which determines whether the wireless communication device 15 operates properly if the radiated performance merely exceeds a specific limit.

Another embodiment of the invention permits the user to program the computer 70 to automatically scan the circumference of the testing chamber 10 and sequentially activate each antenna individually so that a beam sweeping effect is generated within the testing chamber 10. In this sweeping mode, each antenna of the antenna array arrangement 25 may be individually activated and the phase and amplitude of the radiated beam may be adjusted to shape and contour the pattern of the beam in order to minimize the amount of reflections generated within the testing chamber 10. The adjustment of the antenna array arrangement 25 may be performed at either the antenna plane or the beam plane, as shown in FIG. 3. In the sweeping mode as the radio frequency signals propagate between the antenna system 40 and the antenna 17 of the wireless communication device 15. Data points from each antenna 25 will be measured and stored by the computer 70 as each antenna 25 is sequentially activated and adjusted. The computer 70 attempts to quantify the pattern shape of each individual antenna beam. The sweeping mode enables the testing apparatus 100 to collect data points from different view angles while the wireless communication device 15 remains stationary at the center of the testing chamber 10.

Alternatively or in conjunction with the sweeping mode, another embodiment permits the position of the wireless communication device 15 to be varied using the positioner 65 (FIG. 7) so that various data points may be collected from various positions within the testing chamber 10. In order to quantify the radiated performance of the antenna system 17 of the wireless communication device 14, at least one or more antennas of the antenna array arrangement 25 may be activated and directed towards the wireless communication device 15, as the device under testing is physically moved by the positioner 65 in different orientations in order to capture and measure the overall effect of the radiated antenna from different angles. As previously mentioned, the positioner 65 may also be designed to hold multiple wireless communication devices 15. In such an embodiment, the user may manually or automatically selectively activate the wireless communication device 15 desired to be tested.

An alternative or conjunctive embodiment to varying the positioner 65 is to simply spin or rotate the wireless communication device 15 within the positioner 65.

A further testing embodiment enables the transmit elements of the antenna array arrangement 25 to be programmed to implement an integrated mode, which simultaneously activates all of the antennas of the antenna array arrangement 25. The integrated mode integrates all of the energy that the wireless communication device 15 radiates outwardly towards the antenna system 40. Along the forward communication link in the integrated mode, all antennas 25 radiate simultaneously towards the wireless communication device 15 and excite the wireless communication device 15 from all directions and angles. The wireless communication device 15 responds along the reverse communication link and radiates its signal outwardly in all directions toward all of the antennas 25 of the antenna system 40.

In other words, in the integrated mode, the testing apparatus 100 calculates an integrated performance of the wireless communication device 15 because the transmission of the wireless communication radiates its beam over the entire surface area of the testing chamber 10. In one embodiment, in integrated mode, all of the antennas of the antenna array arrangement 25 are simultaneously excited.

Rather than varying the position of the wireless communication device 15, the integrated mode enables the user to perform a quick and rudimentary test of the wireless communication device 15. Instead of quantifying the pattern shape of an individual antenna beam and gathering data points from each individual antenna as performed in the sweeping mode, the integrated mode may merely determine the total sum of the RF signals radiated by the wireless communication device 15 towards the antenna array arrangement 25 of the antenna system 40. The receive elements of all of the antennas of the antenna array arrangement 25 are electronically connected to capture all of the RF signals generated from the wireless communication device 15, and the computer 70 determines the power of the total sum of the received RF signals.

Since the testing chamber 10 of the invention is small in physical size both transmissions of the wireless communication device 15 and the antenna array arrangement 25 may be in close proximity to the wall 20 of the testing chamber 10. Consequently, multi-path propagation, i.e.,—multi-path fading and scattering, may be generated when a signal transmitted along either the forward or reverse communication link impinges the wall 20. Various embodiments of the invention are also capable of averaging out the adverse effects of multi-path propagation in both the forward and reverse communication links. As previously discussed, multi-path propagations are the reflections generated when the signal impinges the interior wall of the testing chamber 10 and bounces off the interior wall creating multiple versions of the original signal and impinges either antenna 17 or 25. When the original signal and the multiple versions reach a receiving element of an antenna within the testing chamber, the energy of each signal may be displaced with respect to one another in time and spatial orientation. The random phase and amplitudes of the different multi-path components cause fluctuations in signal strength, thereby inducing fading, signal distortion or both.

For example, if multiple versions of a sine wave are created within the testing chamber 10, if the generation of the multiple reflections continues to accumulate, at some point, the additive effect of the multiple reflections may skew the test results to indicate that the wireless communication device 15 radiated twice as much power or voltage as actually transmitted by the wireless communication device 15. On the other hand, the subtractive effect of the sine wave may cause the original and reflection waves to perfectly subtract from each other, which may completely cancel each out. Thus, the magnitude of the reflected waves will have a zero summation, which indicates that the wireless communication device 15 does not radiate any energy. This is the worst possible test case.

Fortunately, several embodiments of the invention also serve to combat the deleterious effect of multi-path propagation. One embodiment, which may be initiated during the sweeping mode when each antenna 25 is individually and sequentially activated, is beam contouring of the antenna pattern. By activating and adjusting the parameters of the antennas that are adjacent to and/or nearby the activated antenna to assist in shaping or contouring the beam of the activated antenna, as illustrated in FIG. 4, this embodiment may mitigate detected multi-path propagations. Activation of the adjacent and/or nearby antennas allows the testing apparatus 100 to shape more precisely the beam of the activated antenna in order to sufficiently minimize the reflections generated in the testing chamber 10. The amplitude/gain adjusting elements 50 and the phase adjusting elements 55 may be used to shape the beam radiated from the antenna.

Utilization of the beam shaping technique is not limited to the sweeping mode. The testing apparatus 100 may employ the beam shaping technique whenever adjustments are necessary to compensate for multi-path propagations or other adverse conditions that may develop within the testing chamber 10.

Another embodiment of the invention that mitigates multi-path propagation is the positioner. Because the geometry of the testing chamber 10 of the invention is relatively compact or small when the wireless communication device 15 is located within the testing chamber 10, the device 15 itself or portions of the device may be positioned closer to the wall 20. As previously discussed, the proximity of a wireless communication device 15 to the walls 20 of a testing chamber 10 corresponds directly to the amount of multi-path propagation generated during testing. Alternatively or in conjunction with the employment of the beam shaping technique and/or the sweeping mode, the positioner may be used to relocate the wireless communication device 15 away from a particular segment of the wall 20. Varying the position of the wireless communication device 15 away from the wall 20 lessens the amount of reflections created within the testing chamber 10 and enables the testing apparatus 100 to better test the wireless communication device 15 from various angles.

While the invention has been described with reference to the certain illustrated embodiments, the words which have been used herein are words of description, rather than words of limitation. Changes may be made, within the purview of the appended claims, without departing from the scope and the spirit of the invention in its broader aspects. Although the invention has been described herein with reference to particular structures, materials, and embodiments, such as within the scope of the appended claims.

What is claimed:

1. A testing chamber comprising:
   a holder adapted to support a wireless communication device under test; and
   an antenna arrangement positioned on an inner wall of the testing chamber, the antenna arrangement adapted to be coupled to a data processing device to transmit shaped beams of signals, and to detect incident signals transmitted from the wireless communication device.

2. The testing chamber of claim 1, wherein the holder is movable.

3. The testing chamber of claim 1, wherein the testing chamber is spherical.

4. The testing chamber of claim 1, wherein the antenna arrangement comprises an array of antennas distributed about the inner wall.

5. The testing chamber of claim 1, wherein the testing chamber is configured to form a ring around the wireless communication device.

6. The testing chamber of claim 1, wherein the testing chamber includes an inner surface covered with a signal absorbing material.

7. The testing chamber of claim 1, wherein the antenna arrangement comprises an array of antennas distributed about the inner wall and electrically configured so as to be at least one of selectively, sequentially and simultaneously activated.

8. The testing chamber of claim 1, wherein the antenna arrangement comprises at least one antenna, and at least one of the phase and amplitude of signals transmitted therefrom are selectively shifted.

9. An apparatus comprising:
   a chamber including an array of antennas positioned within an inner wall thereof for receiving and transmitting signals; and
   a data processing device to selectively control the activation of the array of antennas, to modulate the characteristics of the receive or transmit signals of the array of antennas and to determine the magnitude of the transmit and receive signals reflected off the inner wall.

10. The apparatus of claim 9, wherein the data processing device is configured to modulate the phase, amplitude, timing, and spatial orientation of the receive and transmit signals.

11. The apparatus of claim 10, wherein the data processing device includes a holder adapted to support a wireless communication device under test positioned within the chamber for testing its radiated performance.

12. The apparatus of claim 11, wherein the holder is movable.

13. The apparatus of claim 12, wherein the chamber is spherical shaped.

14. The apparatus of claim 13, wherein the array of antennas form a ring along the inner wall of the chamber.

15. The apparatus of claim 14, wherein the chamber includes an inner surface covered with a signal absorbing material.

16. The apparatus of claim 12, wherein the array of antennas substantially encapsulate the inner wall of the chamber.

17. The apparatus of claim 16, wherein the chamber includes an inner surface covered with a signal absorbing material.

18. The apparatus of claim 9, wherein the data processing device selectively controls the activation of the array of antennas adjusts in response to multi-path propagation created within the chamber by a wireless communication device under test.

19. The apparatus of claim 18, wherein the array of antennas is electrically configured so as to be at least one of selectively, sequentially and simultaneously activated.

20. The apparatus of claim 9, wherein the array of antennas is electrically configured so as to be at least one of selectively, sequentially and simultaneously activated.

* * * * *